United States Patent [19]
Kane et al.

[11] Patent Number: 6,061,190
[45] Date of Patent: May 9, 2000

[54] DEVICES FOR HOLDING OPTICAL COMPONENTS AT FIXED POSITIONS

[75] Inventors: Steven J. Kane, Verona; Mark Percevault, West Milford, both of N.J.

[73] Assignee: Optics for Research, Verona, N.J.

[21] Appl. No.: 09/268,498

[22] Filed: Mar. 11, 1999

[51] Int. Cl.[7] .................................................. G02B 7/02
[52] U.S. Cl. .......................... 359/811; 359/819; 359/818; 359/821; 359/822
[58] Field of Search ................... 359/811, 819, 359/818, 821, 822

[56] References Cited

U.S. PATENT DOCUMENTS

| | | | |
|---|---|---|---|
| 2,206,575 | 7/1940 | Pineo | 250/225 |
| 2,375,399 | 5/1945 | Wittig | 356/33 |
| 3,508,832 | 4/1970 | Schroeder | 356/138 |
| 3,860,329 | 1/1975 | Baker et al. | 359/833 |
| 4,381,884 | 5/1983 | Houle | 359/831 |
| 4,470,664 | 9/1984 | Shirasawa | 359/529 |
| 4,600,272 | 7/1986 | Dost et al. | 359/896 |
| 4,826,304 | 5/1989 | Guch, Jr. et al. | 359/831 |
| 4,863,243 | 9/1989 | Wakefield | 359/876 |
| 4,880,301 | 11/1989 | Gross | 359/223 |
| 4,993,870 | 2/1991 | Leib et al. | 359/19 |
| 5,035,487 | 7/1991 | Herz | 359/869 |
| 5,140,470 | 8/1992 | Luecke | 359/818 |
| 6,016,230 | 1/2000 | Nunnally et al. | 359/819 |

*Primary Examiner*—Georgia Epps
*Assistant Examiner*—Saced Seyrafi
*Attorney, Agent, or Firm*—Raymond J. Lillie

[57] ABSTRACT

A device comprising a housing, at least one optical component, such as, for example, a polarizer, contained in the housing, and a base. At least two fixing means are attached to the housing and at least one fixing means is attached to the base. The at least one optical component is fixed at a predetermined position upon mating of at least one of the at least two fixing means attached to the housing with at least one fixing means attached to the base. Such device provides for more precise optical measurements than devices which include optical components that are rotatable through a continuum of angles.

16 Claims, 2 Drawing Sheets

DEVICES FOR HOLDING OPTICAL COMPONENTS AT FIXED POSITIONS

This invention relates to opto-mechanical devices which include optical components contained within an appropriate housing. More particularly, this invention relates to opto-mechanical devices which include fixing means for maintaining optical components contained within such devices at fixed positions.

BACKGROUND OF THE INVENTION

Rotation stages are opto-mechanical devices which hold optical components, such as, for example, polarizers, waveplates, filters, retarders, prisms, optical elements, and optical fibers, and rotate them to specific angular orientations. The rotation stage must perform the precise rotation, and must allow the user to determine the exact angle of rotation. Rotation stages allow for continuous rotation through 360°, and the angular position is indicated generally by a vernier scale.

Even though a continuum of angular orientations are available with conventional rotation stages, in many applications, the only angles which are of interest are 0°, 45°, and 90°, and no other angles. Thus, in many applications, a continuum of angles is unnecessary.

Drawbacks exist with respect to conventional rotation stages. It is difficult, especially when small rotation stages are employed, to measure the rotation angle accurately. For example, it is possible to resolve about 0.5° of angle on a stage having a diameter of 1 inch. For 0.1° accuracy, it is necessary to use larger and more expensive stages. Also, measurements made with conventional rotation stages not always are repeatable. Conventional rotation stages also are subject to human error in that reading a small vernier scale can be confusing, and may be very difficult in low-light conditions. In addition, all conventional rotation stages suffer from backlash and other effects which can compromise the accuracy of the measurement.

BRIEF SUMMARY OF THE INVENTION

In accordance with an aspect of the present invention, there is provided a device, in particular, an optomechanical rotation stage, which comprises a housing and at least one optical component contained in the housing. The device also includes a base. At least two fixing means are attached to the housing, and at least one fixing means is attached to the base. The at least one optical component is fixed at a predetermined position upon mating of at least one of the at least two fixing means attached to the housing with the at least one fixing means attached to the base.

The term "optical component," as used herein, means a component capable of providing for and/or affecting the passage of light therethrough. Such components include, but are not limited to, polarizers, filters, retarders such as half-wave retarders and quarter-wave retarders, prisms, waveplates, optical elements, and optical fibers.

In one embodiment, the at least one optical component comprises a polarizer, and in a preferred embodiment, the at least one optical component comprises a polarizer and a quarter-wave retarder.

In another embodiment, each of the at least two fixing means attached to the housing is capable of being attracted to a magnet, and the at least one fixing means attached to the base is a magnet. In a preferred embodiment, each of the at least two fixing means is a metal disc.

In another embodiment, the base comprises a platform. The at least one fixing means attached to the base is attached to the platform. A plurality of retaining means are disposed at the periphery of said platform. The retaining means surround the housing and prevent the housing from being tilted while being moved within the base or being removed from the base. In a preferred embodiment, the platform has a planar surface in the shape of a quadrilateral, and a retaining means is adjacent each corner of the quadrilateral.

In another preferred embodiment, the device further comprises at least two indicia located on the housing. Each of the at least two indicia corresponds to a predetermined position of the at least one optical component.

In a most preferred embodiment, the housing contains a polarizer and a quarter-wave retarder. The housing also includes a front planar surface, a rear planar surface, and a plurality of side planar surfaces, and a metal disc is attached to each side planar surface. A plurality of indicia, each indicia in general being a number, are printed on the housing. Each indicia corresponds to a specific angular position of the polarizer and the quarter-wave retarder.

The base includes a rectangular platform, with a magnet, which may be in the form of a magnetic disc or annulus, embedded in the surface of the platform. The magnetic disc or annulus is capable of attracting a metal disc attached to a side planar surface of the housing, whereby through such attraction, the housing is fixed at a specific position upon the base, and the polarizer and quarter-wave retarder are fixed at a specific angular position. In general, the diameters of the metal disc attached to a side and the magnetic disc or annulus embedded in the surface of the platform are equal. The base also includes first and second panels attached to opposite sides of the platform. The base also includes four retaining members. Each retaining member is adjacent a corner of the platform and extends upwardly from an end of the panel. The height of the retaining members is approximately that of the housing. The retaining members also serve as a "safety cage" by keeping the housing in a vertical position. Thus, the housing and the polarizer and quarter-wave retarder do not become tilted at an angle to the vertical as the housing is positioned within the base or being removed from the base. Because the housing and the polarizer and quarter-wave retarder are not tilted at an angle to the vertical, the polarizer and quarter-wave retarder will not reflect a beam of light inadvertently into the eyes or other body parts of the user of the device.

The base also includes at least one prong which protrudes downwardly from the platform. The at least one prong may be fitted into an opening in an optical bench, whereby the base is placed in a fixed position.

Such device is applicable particularly to polarimetry, where one measures the state of polarization of a beam of light. In such an application, a linear polarizer and a quarter-wave retarder may be placed in a housing having three sides. The linear polarizer is placed in the housing such that the polarizer can be positioned. at planes of polarization of 0°, 45°, and 90°. The quarter-wave retarder is positioned in the housing such that it is at an orientation of 45° with respect to the linear polarizer. The housing first is placed in the base such that the beam of light contacts the linear polarizer before it contacts the quarter-wave retarder. The housing then is positioned upon the base such that plane of polarization of the linear polarizer is set fixedly at 0°, then set fixedly at 90°, and then set fixedly at 45°. The amount of light transmitted through the polarizer and the quarter-wave retarder is measured at each of these angles. The housing then is removed from the base, and then repositioned in the base such that the beam of light contacts the quarter-wave retarder prior to contacting the linear polarizer. The amount of light transmitted through the quarter-wave retarder and the linear polarizer then is measured. By determining the amount of light transmitted through the linear polarizer and the quarter-wave retarder at each of the above-mentioned positions of the linear polarizer and quarter-wave retarder, the state of polarization of the light may be determined.

BRIEF DESCRIPTION OF THE DRAWINGS

The invention now will be described with respect to the drawings wherein.

DETAILED DESCRIPTION OF THE INVENTION

Figure 1:
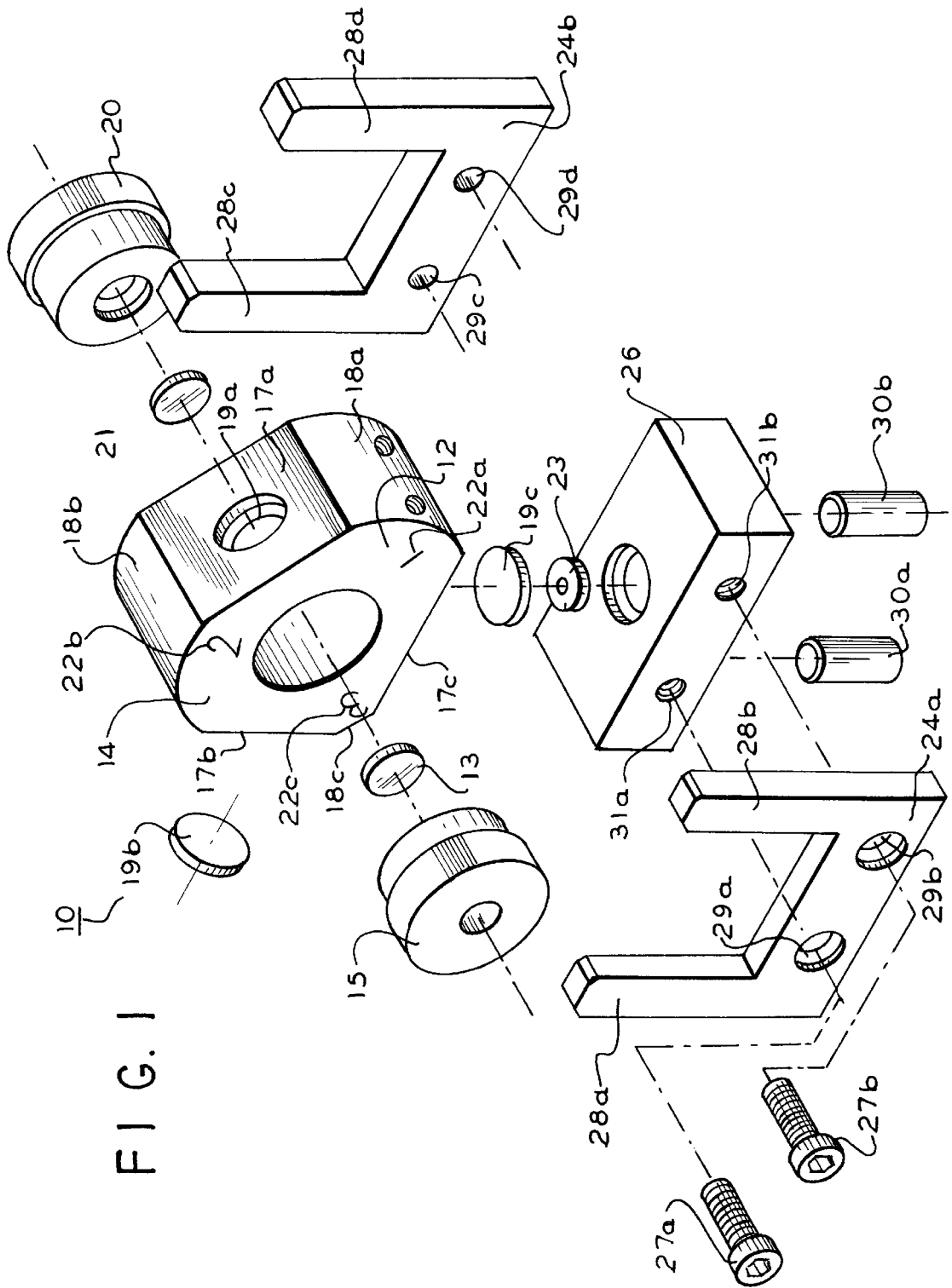
FIG. 1 is a front elevated exploded view of the device of the present invention.
Figure 2:
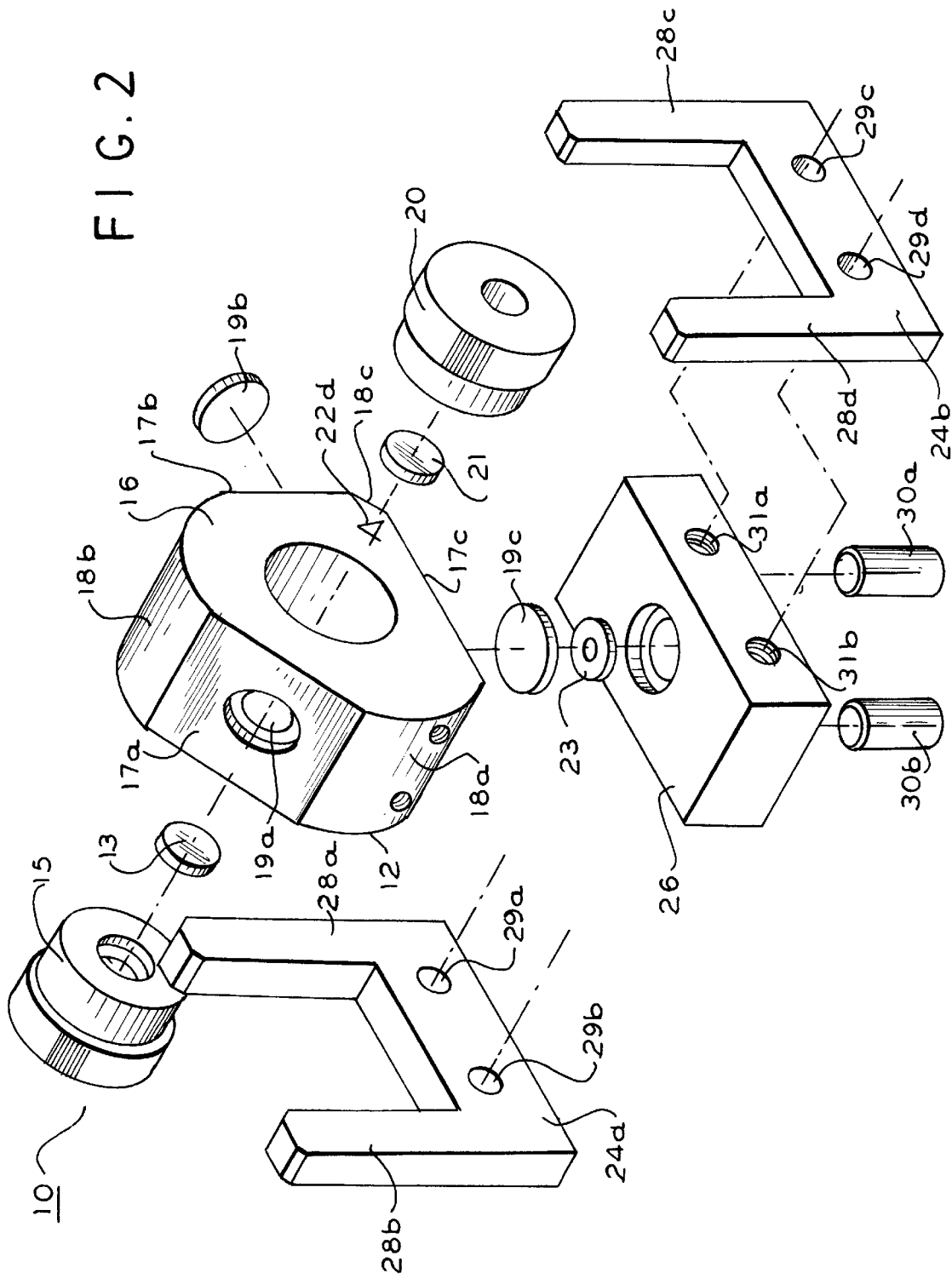
FIG. 2 a rear elevated exploded view of the device of the present invention.

Referring now to the drawings, the device 10 includes a housing 12 which fits within a base upon platform 26. Housing 12 has a front planar surface 14, a rear planar surface 16, side planar surfaces 17a, 17b, and 17c, and rounded portions 18a, 18b, and 18c. Housing 12 also contains a polarizer 13, and includes a polarizer cell 15 which is adjacent front planar surface 14 and holds polarizer 13, and also contains a quarter-wave retarder 21, and includes a retarder cell 20 which is adjacent rear planar surface 16 and holds quarter-wave retarder 21. Metal discs 19a, 19b, and 19c are attached to side planar surfaces 17a, 17b, and 17c, respectively. Each of metal discs 19a, 19b, and 19c is made of a material capable of being attracted to a magnet, such as stainless steel, for example.

The housing 12 further includes indicia 22a, 22b, 22c, printed on front planar surface 14, and indicia 22d printed on the rear planar surface 16. Each of indicia 22a, 22b, 22c, and 22d corresponds to a specific fixed position of polarizer 13 and retarder 21. Indicia 22a, 22b, 22c, and 22d may be in any form known to those skilled in the art, such as Arabic or Roman numerals, letters, or colored markings, for example.

The base includes panels 24a and 24b, which are attached to a rectangular platform 26, into which is embedded a magnet 23, which is in the form of an annulus. Panels 24a and 24b are attached to platform 26 by screws 27a and 27b. Screw 27a is threaded through opening 29a of panel 24a, through opening 31a of platform 26, and into opening 29c of panel 24b. Screw 27b is threaded through opening 29b of panel 24a, through opening 31b of platform 26, and into opening 29d of panel 24b. Extending upwardly from panel 24a at each end of panel 24a are retaining means 28a and 28b. Extending upwardly from panel 24b at each end of panel 24b are retaining means 28c and 28d. Retaining means 28a, 28b, 28c, and 28d serve to maintain housing 12, polarizer 13, and quarter-wave retarder 21 in a vertical or upright position as housing 12 is placed upon and removed from platform 26. Extending downwardly from platform 26 are prongs 30a and 30b. Prongs 30a and 30b may be fitted into openings in an optical bench (not shown), whereby the base is placed in a fixed position.

In the embodiment shown in the drawings, the polarizer 13 is placed in housing 12 such that indicia 22a (indicated as the number 1) corresponds to a plane of polarization of polarized light of 0°, indicia 22b (indicated as the number 2) corresponds to a plane of polarization of polarized light of 90°, and indicia 22c (indicated as the number 3) corresponds to a plane of polarization of polarized light of 45°. When housing 12 is placed in the positions indicated by indicia 22a, 22b, and 22c, the light contacts polarizer 13 before it contacts quarter-wave retarder 21. The quarter-wave retarder 21 is placed in housing 12 such that quarter-wave retarder 21 always is at an orientation of 45° with respect to polarizer 13. Indicia 22d (indicated as the number 4) corresponds to a position of housing 12 where a beam of light contacts quarter-wave retarder 21 before contacting polarizer 13.

In this embodiment, one measures polarized light by taking a series of four measurements. For taking the first measurement, one positions housing 12 upon platform 26 such that disc 19 contacts magnet 23, such that the light will contact polarizer 13 before contacting quarter-wave retarder 21, and indicia 22a is located at the top of housing 12. In this position, polarizer 13 is set such that the plane of polarization of polarized light is 0°. A beam of light then is passed through polarizer 13 and quarter-wave retarder 21, and the amount of light which has passed through polarizer 13 and quarter-wave retarder 21 is measured. For taking the second measurement, one positions housing 12 upon platform 26 such that disc 19 contacts magnet 23, such that the light will contact polarizer 13 before contacting quarter-wave retarder 21, and indicia 22b is located at the top of housing 12. In this position, polarizer 13 is set such that the plane of polarization of polarized light is 90°. Light passing through polarizer 13 and quarter-wave retarder 21 then is measured. For taking the third measurement, one positions housing 12 upon platform 26 such that disc 19 contacts magnet 23, such that the light will contact polarizer 13 before contacting quarter-wave retarder 21, and indicia 22c is located at the top of housing 12. In this position, polarizer 13 is set such that the plane of polarization of polarized light is 45°. Light passing through polarizer 13 and quarter-wave retarder 21 then is measured.

For the fourth measurement, housing 12 is positioned upon platform 26 such that disc 19 contacts magnet 23, such that the light will contact quarter-wave retarder 21 before contacting polarizer 13, and indicia 22d is at the top of housing 12. The amount of light which passes through quarter-wave retarder 21 and then polarizer 13 is measured.

By calculating the amount of light which passes through polarizer 13 and quarter-wave retarder 21 at each of the four above-mentioned positions of housing 12, one can determine the state of polarization of the light from the light source.

As the housing 12 is being switched from one position to another, housing 12, along with polarizer 13 and quarter-wave retarder 21, are retained in an upright or vertical position by retaining means 28a, 28b, 28c, and 28d. Thus, the retaining means 28a, 28b, 28c, and 28d prevent tilting of polarizer 13 and quarter-wave retarder 21, thus preventing inadvertent reflections of beams of light into the eyes or other body parts of the user of the device.

Although the device of the present invention has been shown with respect to a housing having three sides, whereby a polarizer is positioned such that the planes of polarization of polarized light are 0°, 45°, and 90°, the housing may have a number other than three side planar surfaces, and the polarizer may be fixed within the housing such that it can be positioned at planes of polarization of polarized light which are other than 0°, 45°, and 90°. In addition, if desired, the housing of the device of the present invention may contain optical components other than polarizers and retarders, such as, for example, waveplates, filters, prisms, optical elements, and optical fibers.

Advantages of the present invention include the ability to perform extremely precise and repeatable rotations in a compact device. Instead of relying upon a platform that rotates continuously and a vernier indicator, the optical components housed in the device of the present invention can be set to a discrete set of positions, the precision of which is dictated by the mechanical tolerances to which the optical components and the housing were manufactured. The optical components are held in a fixed position by the housing which can be fixed into various positions of rotation. The device does not suffer from a "backlash" of any kind, and thus the repeatability of rotations is enhanced.

It is to be understood, however, that the scope of the present invention is not to be limited to the specific embodiments described above. The invention may be practiced other than as particularly described and still be within the scope of the accompanying claims.

What is claimed is:

1. An opto-mechanical device, comprising:
   a housing;
   a polarizer contained in said housing;
   a quarter-wave retarder contained in said housing;
   a base; and
   at least two fixing means attached to said housing and at least one fixing means attached to said base, where said lens and said quarter wave retarder are fixed at a position upon mating of at least one of said at least two fixing means attached to said housing with said at least one fixing means attached to said base.

2. The device of claim 1 wherein each of said at least two fixing means attached to said housing is capable of being attracted to a magnet, and said at least one fixing means attached to said base is a magnet.

3. The device of claim 1 wherein said base comprises a platform, wherein said at least one fixing means attached to said base is attached to said platform, and a plurality of retaining means disposed at the periphery of said platform.

4. The device of claim 3 wherein said platform has a planar surface in the shape of a quadrilateral, and a retaining means is disposed adjacent each corner of said quadrilateral.

5. The device of claim 2 wherein each of said at least two fixing means is a metal disc.

6. The device of claim 1 wherein said device further comprises at least two indicia on said housing, wherein said at least two indicia corresponds to a position of said polarizer and said quarter-wave retarder.

7. The device of claim 5 wherein said housing comprises a front planar surface, a rear planar surface, and a plurality of side planar surfaces and wherein a metal disc is attached to each of said side planar surfaces.

8. An opto-mechanical device, comprising:
   a housing;
   at least one optical component contained in said housing;
   a base; and
   at least two fixing means attached to said housing, wherein each of said at least two fixing means attached to said housing is capable of being attracted to a magnet, and a magnet attached to said base, where said at least one optical component is fixed at a position upon mating of at least one of said at least two fixing means attached to said housing with said magnet attached to said base.

9. An opto-mechanical device, comprising:
   a housing;
   at least one optical component contained in said housing;
   a base;
   at least two fixing means attached to said housing and at least one fixing means attached to said base, where said at least one optical component is fixed at a position upon mating of at least one of said at least two fixing means attached to said housing with said at least one fixing means attached to said base; and
   at least two indicia on said housing, wherein each of said at least two indicia corresponds to a position of said at least one optical component.

10. The device of claim 8 wherein said base comprises a platform, wherein said magnet is attached to said platform, and a plurality of retaining means disposed at the periphery of said platform.

11. The device of claim 10 wherein said platform has a planar surface in the shape of a quadrilateral, and a retaining means is disposed adjacent each corner of said quadrilateral.

12. The device of claim 8 wherein each of said at least two fixing means is a metal disc.

13. The device of claim 8 wherein said device further comprises at least two indicia on said housing, wherein each of said at least two indicia corresponds to a position of said at least one optical component.

14. The device of claim 12 wherein said housing comprises a front planar surface, a rear planar surface, and a plurality of side planar surfaces and wherein a metal disc is attached to each of said side planar surfaces.

15. The device of claim 9 wherein said at least one optical component comprises a polarizer.

16. The device of claim 15 wherein said at least one optical component further comprises a quarter-wave retarder.

* * * * *